United States Patent
Gonion et al.

(10) Patent No.: US 9,223,397 B2
(45) Date of Patent: Dec. 29, 2015

(54) PERSONAL COMPUTING DEVICE CONTROL USING FACE DETECTION AND RECOGNITION

(71) Applicant: Apple Inc., Cupertino, CA (US)

(72) Inventors: Jeff Gonion, Campbell, CA (US); Duncan Robert Kerr, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/090,344

(22) Filed: Nov. 26, 2013

(65) Prior Publication Data
US 2014/0085191 A1   Mar. 27, 2014

Related U.S. Application Data

(63) Continuation of application No. 12/074,985, filed on Mar. 6, 2008, now Pat. No. 8,600,120.

(60) Provisional application No. 61/009,888, filed on Jan. 3, 2008.

(51) Int. Cl.
| G06K 9/00 | (2006.01) |
| G06F 3/00 | (2006.01) |
| G06F 1/32 | (2006.01) |
| G06F 21/32 | (2013.01) |
| G06F 21/62 | (2013.01) |
| G06K 9/62 | (2006.01) |

(52) U.S. Cl.
CPC .............. *G06F 3/005* (2013.01); *G06F 1/3231* (2013.01); *G06F 21/32* (2013.01); *G06F 21/629* (2013.01); *G06K 9/00221* (2013.01); *G06K 9/6253* (2013.01); *Y02B 60/1289* (2013.01)

(58) Field of Classification Search
USPC .......................... 382/118, 181, 209, 217–222
See application file for complete search history.

(56) References Cited

U.S. PATENT DOCUMENTS

| 5,229,764 | A | 7/1993 | Matchett et al. |
| 6,104,922 | A | 8/2000 | Baumann |
| 6,374,145 | B1 | 4/2002 | Lignoul |
| 6,829,384 | B2 | 12/2004 | Schneiderman et al. |
| 7,088,220 | B2 | 8/2006 | Kotzin |
| 7,130,454 | B1 * | 10/2006 | Berube et al. ................. 382/118 |
| 7,233,684 | B2 | 6/2007 | Fedorovskaya et al. |
| 7,234,156 | B2 | 6/2007 | French et al. |
| 7,627,343 | B2 | 12/2009 | Fadell et al. |
| 2003/0059092 | A1 | 3/2003 | Okubo et al. |
| 2003/0103652 | A1 | 6/2003 | Lee et al. |
| 2004/0257196 | A1 * | 12/2004 | Kotzin ........................ 340/5.52 |
| 2006/0192775 | A1 | 8/2006 | Nicholson et al. |
| 2007/0009139 | A1 * | 1/2007 | Landschaft et al. .......... 382/115 |
| 2009/0082066 | A1 | 3/2009 | Katz |
| 2011/0065479 | A1 | 3/2011 | Nader |

OTHER PUBLICATIONS

Belongie, Serge et al., "Shape Matching and Object Recognition Using Shape Contexts," IEEE Transaction on Pattern Analysis and Machine Intelligence, (2002) pp. 509-522, 24 (24).

(Continued)

*Primary Examiner* — Wesley Tucker
(74) *Attorney, Agent, or Firm* — Van Court & Aldridge LLP (57) ABSTRACT

Systems and methods are provided for control of a personal computing device based on user face detection and recognition techniques.

21 Claims, 9 Drawing Sheets

(56) References Cited

OTHER PUBLICATIONS

J. Bishop: "The Internet for educating individuals with social impairments"; Journal of Computer Assisted Learning (2003) 19, 546-556; © 2003 Blackwell Publishing Ltd.

Turk, Matthew et al., "Eigenfaces for Recognition," Massachusetts Institute of Technology, Journal of Cognitive Neuroscience, (1991), pp. 71-86,3 (1).

Yang, Mh et al., "Detecting Faces in Images: A Survey," IEEE Transactions on Pattern Analysis and Machine Intelligence, (2002): pp. 34-58, 24 (1).

* cited by examiner

PERSONAL COMPUTING DEVICE CONTROL USING FACE DETECTION AND RECOGNITION

REFERENCE TO RELATED APPLICATIONS

This application is a continuation of U.S. patent application Ser. No. 12/074,985, filed on Mar. 6, 2008 (now U.S. Pat. No. 8,600,120), which claims priority to and the benefit of U.S. Provisional Patent Application No. 61/009,888, filed on Jan. 3, 2008. The contents of these earlier application are incorporated herein by reference.

BACKGROUND

This invention relates to personal computing devices and, more particularly, to personal computing device control using face detection and recognition.

A personal computing device may include any computing device or computer-controlled device capable of interacting or interfacing with a person. Types of personal computing devices may include personal computers, consumer electronics, personal media devices, personal communications devices, personal display devices, vehicle control systems, financial transactions systems, and any like computing device capable of interfacing with a person. Consumer electronic devices may include, without limitations, televisions, stereo systems, video gaming systems, cameras, video cameras, and task-specific computing devices. Personal computers may include, without limitation, desktop computers, laptop computers, portable computers, workstations, server interfaces, and handheld computers. Personal media devices may include, without limitation, cellular telephones, MP3 players, portable video players, media capable cellular telephones, and satellite media players. Personal communications devices may include wireless communications devices, cellular telephones, satellite phones, personal digital assistants (PDA), and other like communications devices. Vehicle control systems may include, without limitation, consumer electronic devices, personal media devices, personal communication devices, vehicle operating systems, and vehicle monitoring systems. Financial transactions systems may include, without limitation, automatic teller machines (ATM), store purchase/check-out systems, credit card transaction systems, and remote purchase systems.

The proliferation of such personal computing devices is so extensive and pervasive that many tasks performed by individuals, in their daily lives, involve some form of interaction with one or more personal computing devices. Typically, users can actively or passively interface with a personal computing device. Active interfacing may include typing words on a keyboard, saying words, scrolling through a list, using a mouse pointer to select an icon, pressing one or more control buttons, and any like active user interaction. Passive interfacing may include viewing a text file, viewing an image, viewing a movie, listening to a song, listening to audio, or feeling a vibration or motion.

One problem with existing personal computing devices is that such devices often perform certain functions regardless of whether users are passively interfacing with the devices. In other words, personal computer devices are not able to determine whether a non-active or passive user is present and, subsequently, are unable to perform certain operations to accommodate the passive user. For example, a PC may automatically activate a screen saver every five minutes regardless of whether a user is viewing the PC's display screen. Thus, a passive user is often inconveniently required to actively perform an interaction with the PC at least every five minutes to prevent the initiation of the screen saver or to deactivate the screen saver after it is initiated. Accordingly, there is a need for providing a user interface for a personal computing device that is capable of determining when a passive user is present without the need for active user interaction with the device.

Another problem with personal computing devices is that such devices often cannot efficiently determine whether certain users have the authority to perform certain functions of the personal computing device. For example, to access a restricted computer application, a user may be required to actively enter a password. Accordingly, there is a need for a more efficient and reliable user access control mechanism for personal computing devices.

SUMMARY

The invention, in various embodiments, addresses deficiencies in the prior art by providing systems, methods and devices that enable a personal computing device to detect the presence of at least one user, without the need for receiving active user input information, and control certain device operations depending on whether a user is present.

In one aspect, a personal computing device includes a user interface that generates one or more user information outputs and receives one or more user information inputs. The device also includes an image sensor for capturing one or more images. The device further includes a processor that detects one or more faces in the captured images and controls the generation of the user information outputs and the receiving of the user information inputs in response to the detection of the one or more faces.

In one configuration, controlling is in response to identifying one or more detected faces in the captured images. In one feature, identifying includes determining that at least one of the detected faces in the captured images is associated with an authorized user of the device. Face detection may be based on a pattern recognition algorithm. The pattern recognition algorithm may include a statistical model.

In another configuration, detecting includes employing at least one of face detection, face recognition, object recognition, view-based recognition, computer vision, and machine learning. Face detection may be based on at least one of knowledge-based methods, feature invariant approaches, template matching methods, and appearance-based methods.

A user information output may be derived from displaying one or more images, displaying video, displaying text, outputting audio, moving a portion of the device, and vibrating a portion of the device. The process of controlling may include continuing to display one or more interface images for a period of time after detecting a face or faces. The process of controlling may include inhibiting, delaying, or re-setting the initiation of a screen saver application.

In another configuration, user information inputs may be derived from a user typing words on a keyboard, saying words, scrolling through a list, using a mouse pointer to select an element, and/or pressing one or more control buttons.

The process of controlling may include controlling the operation of one or more applications of the device. An operation may include logging into or out of an application, starting or launching one or more applications, stopping or ending one or more applications, selecting or de-selecting one or more elements, increasing or decreasing one or more settings, moving through a list of elements, initiating or ending a communications session, playing music or video, pausing music or video, and/or initiating or ending an audio or video recording session. An element may include a song, a video, a music file, an audio file, a video file, a photograph, a media file, a data file, spreadsheet, document, an application icon, an activation icon, a control button, a data file, and/or contact data.

In one configuration, the image sensor includes a camera which may be integrated with an image display of a personal computing device. The personal computing device may include a personal computer, a portable computer, a cellular telephone, a wireless communications device, a media player, an MP3 player, a video player, and a PDA.

In another aspect, a personal media device includes an image sensor that captures one or more images and generates associated image data. The device also includes a data store having face detection data associated with at least one of knowledge based face detection, feature invariant based face detection, template matching based face detection, and appearance based face detection. The device further includes a processor that receives the image data, receives the face detection data, and detects the presence of a face in the captured images by processing the image data and face detection data. Then, the device controls the operation of an application in response to detecting the presence of a face in the captured images.

In a further aspect, a personal media device includes an image sensor that captures one or more images. The device includes a data store having at least one known face pattern that is associated with an authorized user of the media device. The device includes a processor that detects one or more faces in the captured images, recognizes at least one of faces as the face of the authorized user by comparing the one or faces with the data store, and controlling the operation of an application of the device in response to recognizing at least one of the faces as the face of the authorized user.

In another aspect, a personal communications device includes a transceiver that sends and receives user communications. The device also includes an image sensor that captures one or more images and generates associated image data. The device also includes a data store having face detection data associated with knowledge based face detection, feature invariant based face detection, template matching based face detection, and/or appearance based face detection. The device further includes a processor that receives the image data, receives the face detection data, detects the presence of a face in the captured images by processing the image data and face detection data, and controls the sending or receiving of a communication of the device in response to detecting the presence of a face in the captured images. The communication may include an electronic mail (e-mail) message, instant message, video message, multi-media message, audio message, and/or user voice call.

In yet another aspect, a personal communications device includes a transceiver that sends and receives user communications. The device includes an image sensor that captures one or more images. The device also includes a data store having at least one known face pattern that is associated with an authorized user of the media device. The device further includes a processor that detects one or more faces in the captured images, recognizes at least one of the captured faces as the face of the authorized user by comparing the one or faces with the data store, and controls the sending or receiving of a communication of the device in response to recognizing that at least one of the captured faces is the face of the authorized user.

Various advantages and applications using user presence detection and recognition for a personal computing device in accordance with principles of the present invention are discussed in more detail below.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which.

DETAILED DESCRIPTION OF THE DISCLOSURE

Figure 1A:
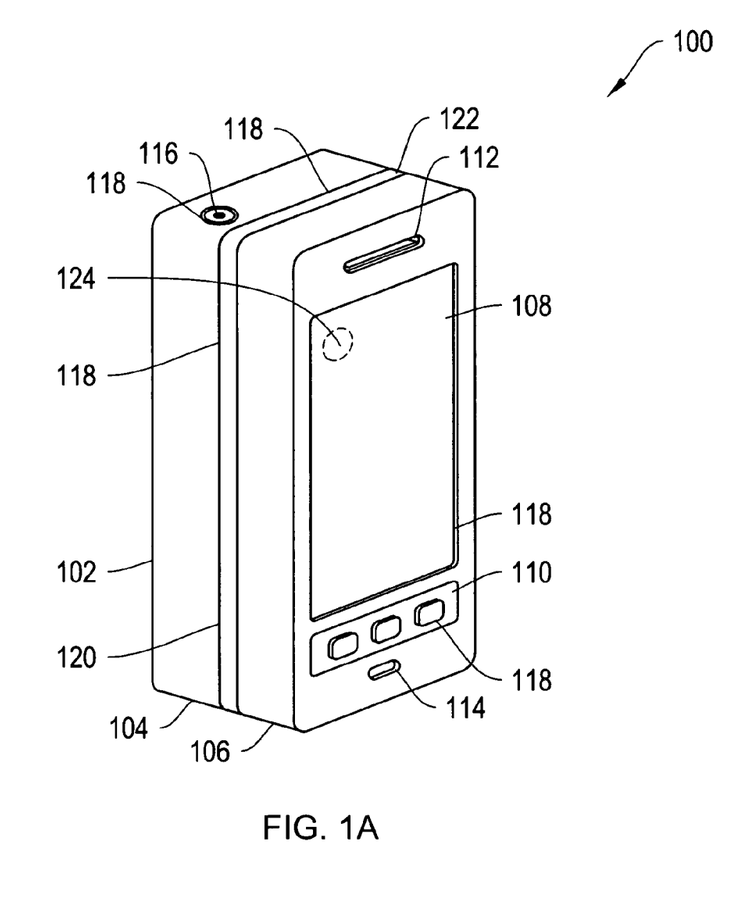
FIG. 1A is a perspective view of a personal computing device according to an illustrative embodiment of the invention.

FIG. 1A is a perspective view of a personal computing device 100 in the form of a personal media or display device according to an illustrative embodiment of the invention. The device 100 includes a housing 102, a first housing portion 104, a second housing portion 106, a display 108, a keypad 110, a speaker housing aperture 112, a microphone housing aperture 114, a headphone jack 116, and frame sidewall 122. In certain embodiments, the frame sidewall 122 is the exposed portion of a frame residing within or adjacent to the housing 102 that provides structural support for the media device 100 and various internal components. The housing 102 may also include various gaps 118 that may include openings, separations, vents, or other pathways between elements of the housing 102 which enable the passage of air or sound through the housing 102.

In one embodiment, the housing 102 includes a first housing portion 104 and a second housing portion 106 that are fastened together and/or to the frame sidewall 122 to encase various components of the media device 100. The housing 102 and its housing portions 104 and 106 may include polymer-based materials that are formed by, for example, injection molding to define the form factor of the media device 100. In one embodiment, the housing 102 surrounds and/or supports internal components such as, for example, a display 108 with externally controlled, variable brightness, one or more circuit boards having integrated circuit components, internal radio frequency (RF) circuitry, an internal antenna, a speaker, a microphone, a hard drive, a processor, and other components. Further details regarding certain internal components are discussed herein with respect to FIG. 3. The housing 102 provides for mounting of a display 108, keypad 110, external jack 116, data connectors, or other external interface elements. The housing 102 may include one or more housing apertures 112 to facilitate delivery of sound, including voice and music, to a user from a speaker within the housing 102. The housing 102 may include one or more housing apertures 114 to facilitate the reception of sounds, such as voice, for an internal microphone from a device user.

The device 100 may include a personal media device and/or wireless communications device such as a cellular telephone, satellite telephone, cordless telephone, personal digital assistant (PDA), pager, portable computer, or any other device capable of wireless communications. In certain embodiments, the personal computing device 100 may include any computing device, dedicated processing device, television, display unit, or like device that includes a user interface.

The personal computing device 100 may also be integrated within the packaging of other devices or structures such as a vehicle, video game system, appliance, clothing, helmet, glasses, wearable apparel, stereo system, entertainment system, or other portable devices. In certain embodiments, device 100 may be docked or connected to a wireless enabling accessory system (e.g., a wi-fi docking system) that provides the device 100 with short-range communicating functionality. Alternative types of devices 100 may include, for example, a media player such as an ipod or iphone that are made available by Apple Inc., of Cupertino, Calif., pocket-sized personal computers such as an iPAQ Pocket PC available by Hewlett Packard Inc., of Palo Alto, Calif. and any other device capable of communicating wirelessly (with or without the aid of a wireless enabling accessory system).

In certain embodiments, the personal computing device 100 may synchronize with, for example, a remote computing system or server to receive media (using either wireless or wireline communications paths). Wireless syncing enables the device 100 to transmit and receive media and data without requiring a wired connection. Media may include, without limitation, sound or audio files, music, video, multi-media, and digital data, in streaming and/or discrete (e.g., files and packets) formats.

During synchronization, a host system may provide media to a client system or software application embedded within the device 100. In certain embodiments, media and/or data is "downloaded" to the device 100. In other embodiments, the device 100 is capable of uploading media to a remote host or other client system. Further details regarding the capabilities of certain embodiments of the device 100 are provided in U.S. Pat. No. 7,627,343, the entire contents of which are incorporated herein by reference.

Personal computing devices of this type may include touchscreen remote controls, such as a Pronto made available by Royal Philips Electronics of the Netherlands or a handheld GPS receiver made available by Garmin International, Inc. of Olathe, Kans. In certain embodiments, the display 108 includes a graphical user interface (GUI) to enable a user to interact with the device 100. The personal computing device 100 may also include an image sensor 124 that enables the device 100 to capture an image or series of images (e.g., video) continuously, periodically, at select times, and/or under select conditions. The image sensor 124 may include a camera capable of capturing photographic images and/or video images. The sensor may be integrated with and/or within the display 108. In certain embodiments, the image sensor 124 may be located along the periphery of the display 108 or any other location of the housing 102.

Figure 1B:
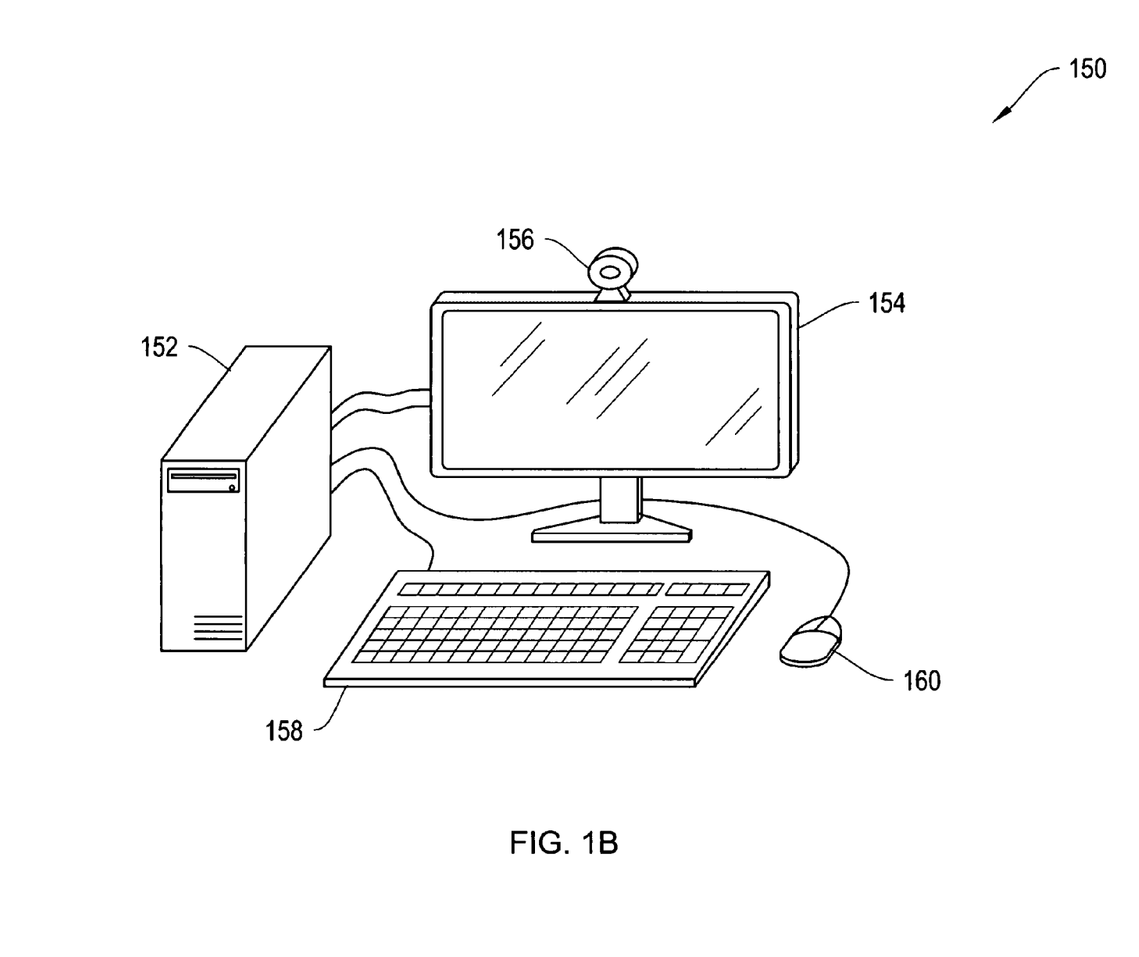
FIG. 1B is another perspective view of a personal computing device according to an illustrative embodiment of the invention.

FIG. 1B is a perspective view of another type of personal computing device, in the form of a desktop PC system 150, according to an illustrative embodiment of the invention. In this embodiment, as opposed to the embodiment of FIG. 1A, the PC system 150 includes a computing system housing 152, a display assembly 154, a camera 156, keyboard 158, and pointer device 160, e.g., a mouse.

Figure 2:
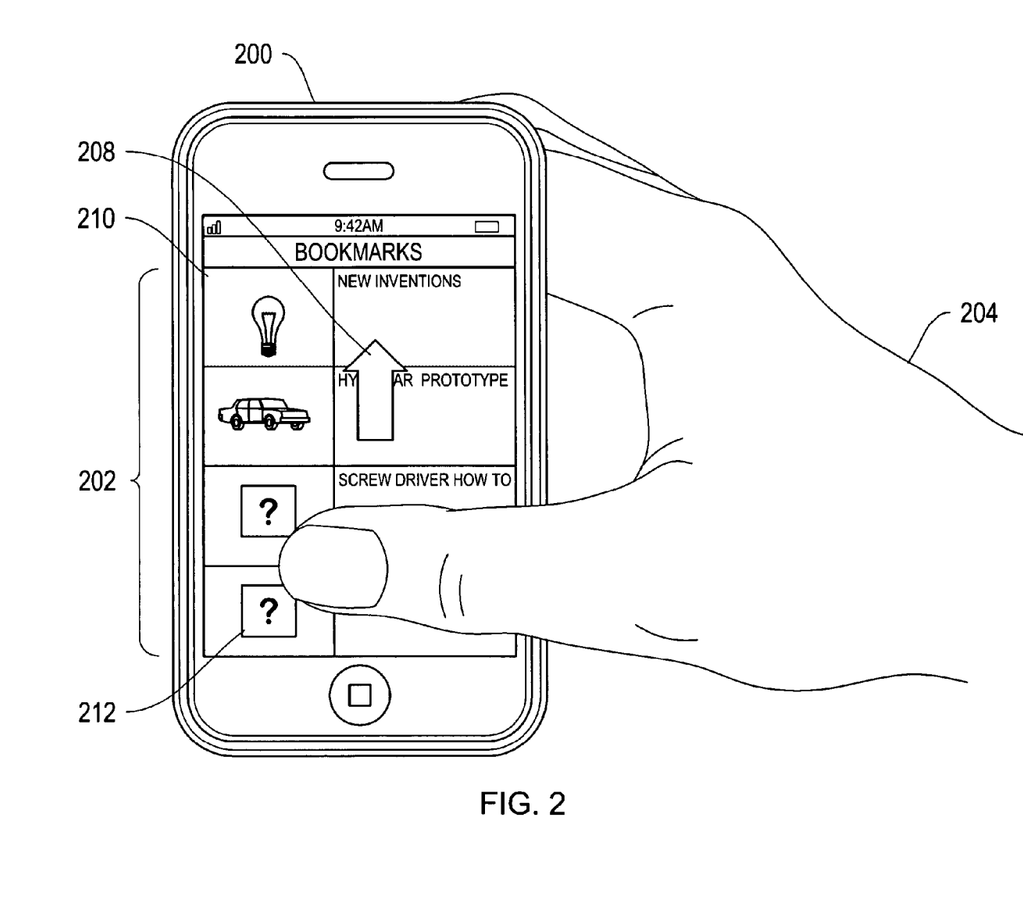
FIG. 2 is a view of a handheld personal computing device according to an illustrative embodiment of the invention.

FIG. 2 is a view of a handheld personal computing device 200, e.g., a personal media device, according to an illustrative embodiment of the invention. The device 200 includes an interactive display 210 capable of allowing a user to scroll through a listing 202 of elements 212 in a direction 208 while the device 200 is held in the hand 204 of a user.

Figure 3:
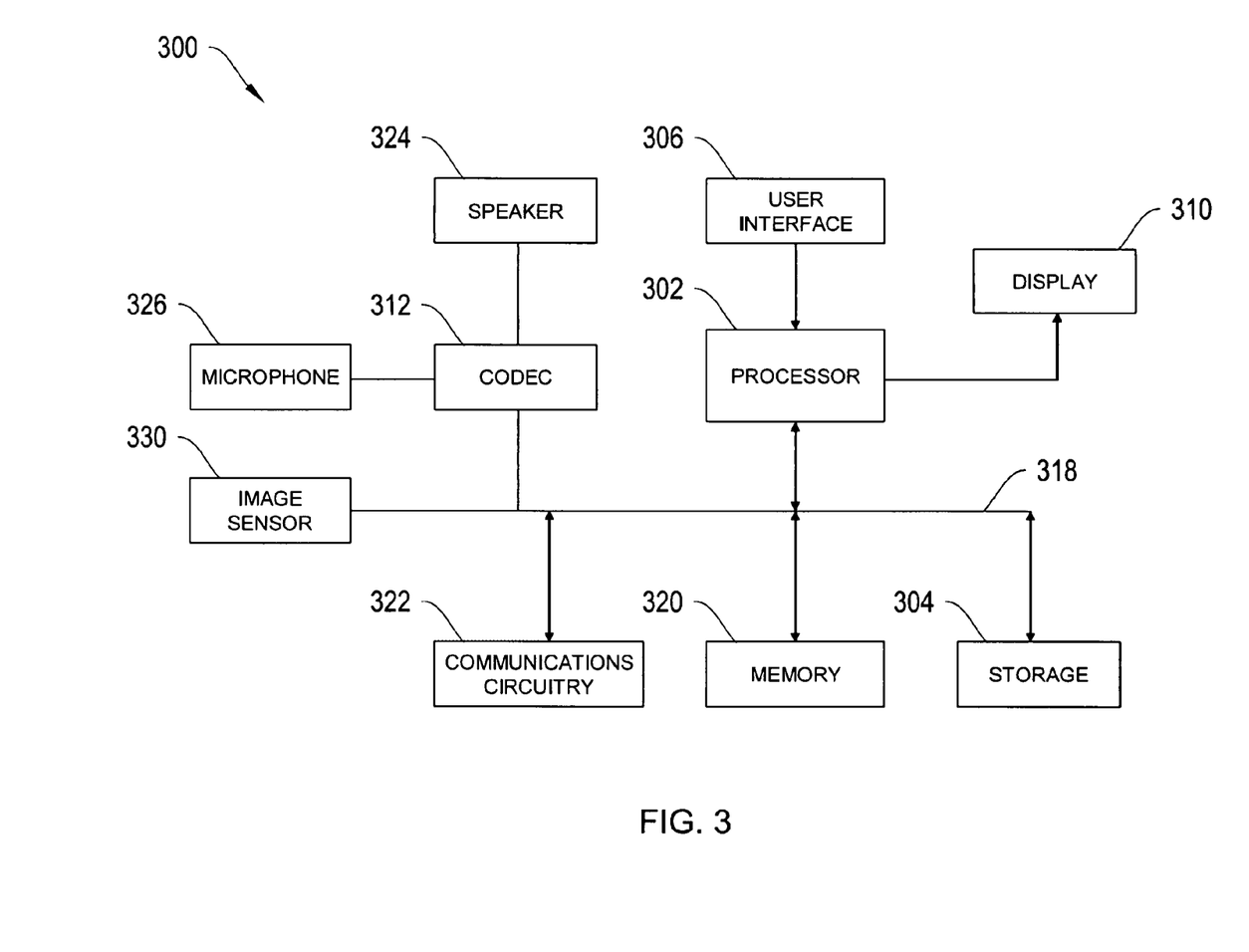
FIG. 3 shows a simplified functional block diagram of a personal computing device according to an illustrative embodiment of the invention.

FIG. 3 shows a simplified functional block diagram of personal computing device 300 according to an illustrative embodiment of the invention. The block diagram provides a generalized block diagram of a computer system such as may be employed, without limitation, by the personal computing devices 100, 150, and 200. The personal computing device 300 may include a processor 302, storage device 304, user interface 306, display 310, CODEC 312, bus 318, memory 320, communications circuitry 322, a speaker or transducer 324, a microphone 326, and an image sensor 330. Processor 302 may control the operation of many functions and other circuitry included in personal computing device 300. Processor 302 may drive display 310 and may receive user inputs from the user interface 306.

Storage device 304 may store media (e.g., music and video files), software (e.g., for implanting functions on device 300), preference information (e.g., media playback preferences), lifestyle information (e.g., food preferences), personal information (e.g., information obtained by exercise monitoring equipment), transaction information (e.g., information such as credit card information), word processing information, personal productivity information, wireless connection information (e.g., information that may enable a media device to establish wireless communication with another device), subscription information (e.g., information that keeps track of podcasts or television shows or other media a user subscribes to), and any other suitable data. Storage device 304 may include one more storage mediums, including, for example, a hard-drive, permanent memory such as ROM, semi-permanent memory such as RAM, or cache.

Memory 320 may include one or more different types of memory which may be used for performing device functions. For example, memory 320 may include cache, ROM, and/or RAM. Bus 318 may provide a data transfer path for transferring data to, from, or between at least storage device 304, memory 320, and processor 302. Coder/decoder (CODEC) 312 may be included to convert digital audio signals into analog signals for driving the speaker 324 to produce sound including voice, music, and other like audio. The CODEC 312 may also convert audio inputs from the microphone 326 into digital audio signals. The CODEC 312 may include a video CODEC for processing digital and/or analog video signals.

User interface 306 may allow a user to interact with the personal computing device 300. For example, the user input device 306 can take a variety of forms, such as a button, keypad, dial, a click wheel, or a touch screen. Communications circuitry 322 may include circuitry for wireless communication (e.g., short-range and/or long range communication). For example, the wireless communication circuitry may be wi-fi enabling circuitry that permits wireless communication according to one of the 802.11 standards. Other wireless network protocol standards could also be used, either in alternative to the identified protocols or in addition to the identified protocols. Other network standards may include Bluetooth, the Global System for Mobile Communications (GSM), and code division multiple access (CDMA) based wireless protocols. Communications circuitry 322 may also include circuitry that enables device 300 to be electrically coupled to another device (e.g., a computer or an accessory device) and communicate with that other device.

In one embodiment, the personal computing device 300 may be a portable computing device dedicated to processing media such as audio and video. For example, the personal computing device 300 may be a media device such as media player (e.g., MP3 player), a game player, a remote controller, a portable communication device, a remote ordering interface, an audio tour player, or other suitable personal device. The personal computing device 300 may be battery-operated and highly portable so as to allow a user to listen to music, play games or video, record video or take pictures, communicate with others, and/or control other devices. In addition, the personal computing device 300 may be sized such that it fits relatively easily into a pocket or hand of the user. By being handheld, the personal computing device 300 (or media device 100 shown in FIG. 1) is relatively small and easily handled and utilized by its user and thus may be taken practically anywhere the user travels.

As discussed previously, the relatively small form factor of certain types of personal computing devices 300, e.g., personal media devices, enables a user to easily manipulate the device's position, orientation, and movement. Accordingly, the personal computing device 300 may provide for improved techniques of sensing such changes in position, orientation, and movement to enable a user to interface with or control the device 300 by affecting such changes. Further, the device 300 may include a vibration source, under the control of processor 302, for example, to facilitate sending motion, vibration, and/or movement information to a user related to an operation of the device 300. The personal computing device 300 may also include an image sensor 330 that enables the device 300 to capture an image or series of images (e.g., video) continuously, periodically, at select times, and/or under select conditions.

Face detection and recognition are different processes. Face detection includes the process of detection and/or locating a face or faces within an image. Face recognition includes the process of recognizing that a detected face is associated with a particular person or user. Face recognition, however, is typically performed along with and/or after face detection.

Face detection and recognition are known in technology fields such as robotics and computer vision. However, there are numerous advantageous applications of this technology that enable more efficient control and interaction between a user and a personal computing system. In certain embodiments, a personal computing device such as devices 100, 150, and 200, include an image sensor, e.g., a camera, that is orientated such that it is capable of sensing the presence of a user's face while the user is interfacing, either passively or actively, with the personal computing device. For example, the image sensor may be embedded within a display of the device such as image sensor 124 of FIG. 1A. Alternatively, the image sensor may be connected with and/or mounted on a display such as image sensor 156 of FIG. 1B. Thus, the image sensor, in certain embodiments, operating with the personal computing device's processor, acts as a user presence sensor and/or user authenticator depending on the requirements of an application running on the personal computing device.

Figure 4:
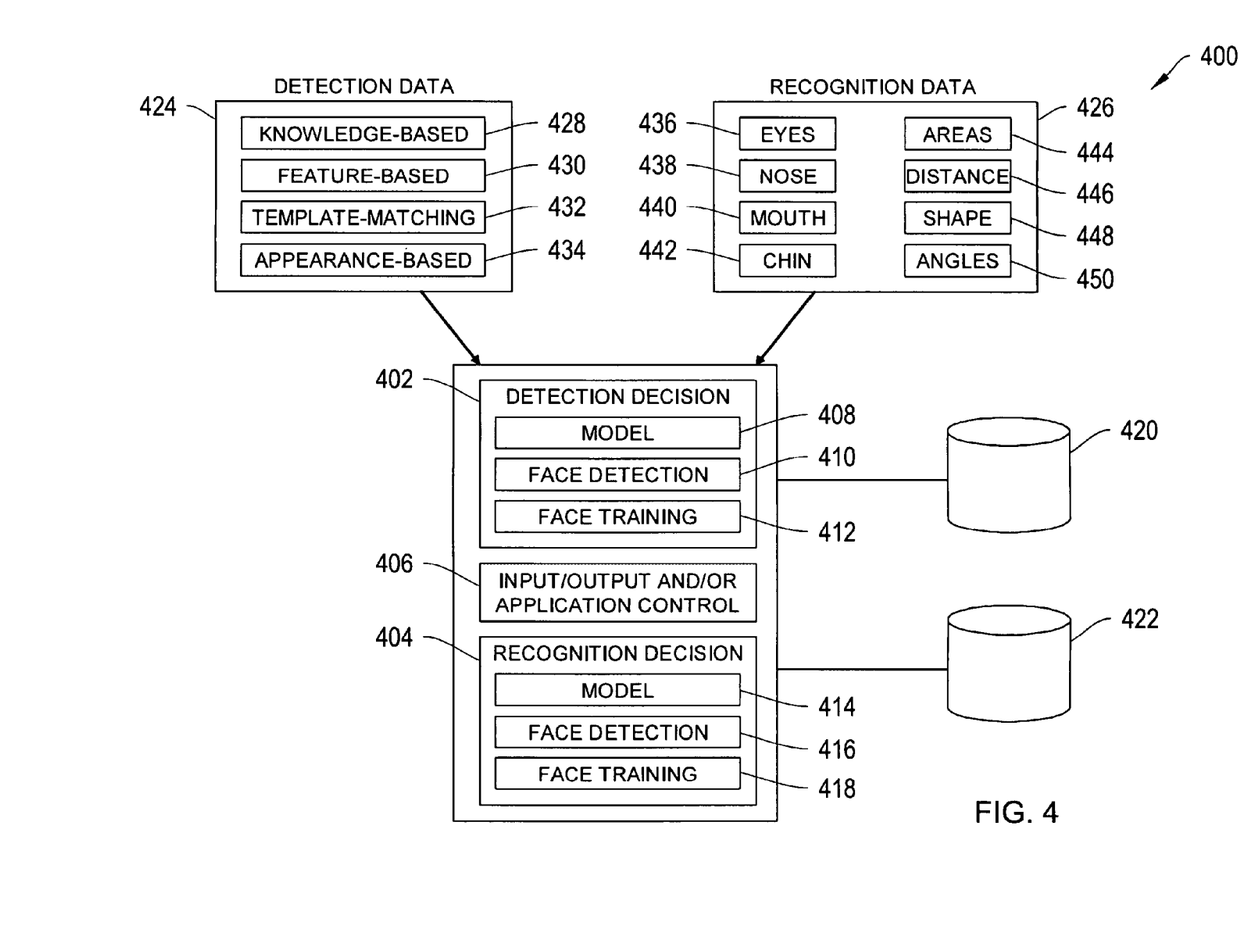
FIG. 4 is a diagram of a computer processing environment including various applications or routines running within a personal computing device according to an illustrative embodiment of the invention.

FIG. 4 is a diagram of a computer processing environment 400 including various applications or routines running within a personal computing device according to an illustrative embodiment of the invention. The processing environment 400 may include a detection decision application 402, a face recognition decision application 404, and an input/output and/or application control application 406. The environment 400 may also include detection data 424 and recognition data 426, a face vector database 420 and/or an input/output interface configuration database 422. The detection data 424 may include, without limitation, data associated with knowledge-based detection techniques 428, feature-based detection techniques 430, template matching techniques 432, and/or appearance-based detection techniques 434.

In certain embodiments, the input/output control application 404 and/or another application configure the input and/or output characteristics of a personal computing device based on a determination of the presence of a face by the decision application 402. The decision application 402 may determine the presence of a user's face by comparing received image data from an image sensor that is scanning an area where a user is expected to be with a known set of data associated with at least one of techniques 428, 430, 432, and 434. The decision application 402 may include a decision model 408, a face detection application 410, and/or a face detection training application 412. In one embodiment, the model 408 includes a model based on at least one of the knowledge-based detection technique 428, the feature-based detection technique 430, and template matching technique 432, and the appearance-based technique 434.

Knowledge-based techniques may be based on rule-based and/or top-down methods that encode prior knowledge of what is included in a typical human face. The rules may include relationships between facial features and may be advantageous for face localization.

Feature-based and/or Feature invariant techniques specify structural features of a face that exist under varying conditions such as changes in pose, viewpoint, image quality, and/or lighting. This technique may be advantageous for face localization. Feature invariant techniques may include, without limitation, facial feature data, facial texture data, facial skin color data, and/or a combination of color, size, and shape of a face.

Template matching techniques may include methods of storing standard features of a face and using a correlation between an input image and the stored patterns to detect a face or faces. Template matching may include, without limitation, pre-defined templates and/or deformable templates.

Appearance-based techniques may include models that are learned from a set of training images that capture the variability of facial features. Appearance-based techniques may include, without limitation, eigenface data, distribution-based data, neural networks, support vector machines, naive bayes classifiers, hidden markov models, and information theoretical approaches.

The recognition decision application 404 may include a decision model 414, a face recognition application 416, and/or a face recognition training application 418. In one embodiment, the model 414 includes a model based on at least one of the knowledge-based detection technique 428, the feature-based detection technique 430, template matching technique 432, and the appearance-based technique 434, and any other statistical and/or predictive analysis techniques. In certain embodiments, the recognition data 426 includes data associated with face features to enable identification of a particular user's face such as, without limitation, eyes data 436, nose data 438, mouth data 440, chin data 442, face areas data 444, face feature distance data 446, face shape data 448, and/or face feature angles data 450.

Figure 5:
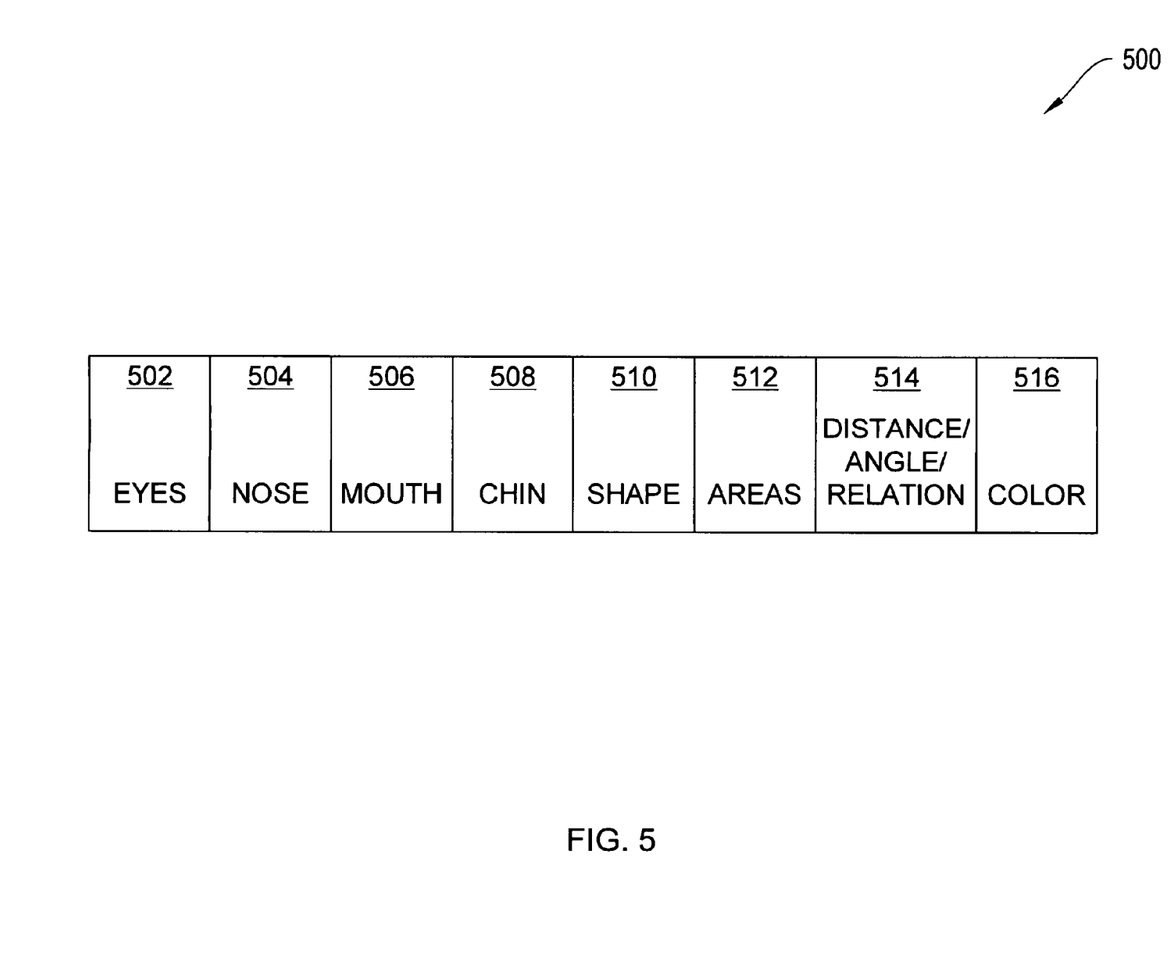
FIG. 5 is a face vector including various face features according to an illustrative embodiment of the invention.

FIG. 5 is a diagram of a face feature vector 500 including various facial features associated with a user or class of users according to an illustrative embodiment of the invention. The face feature vector 500 may include one or more elements such as, without limitation, eyes data 502, nose data 504, mouth data 506, chin data 508, face shape data 510, face areas data 512, face feature distance/angle/relation data 514, and/or skin color data 516. In certain embodiments, the face feature vector 500 may include other data associated with the detection data 424 and/or recognition data 426. In one embodiment, with respect to face recognition, the vector 500 is derived from a detected face in an image, and used to identify a particular user's face. In another embodiment, with respect to face detection, the vector 500 is derived from a sensed image, and used to detect the presence of a face in the image.

In one embodiment, a personal computing device generates an image sensor signal and/or signals including detection data 424 and/or recognition data 426. The various data 428, 430, 432, 434, 436, 438, 440, 442, 444, 446, 448, and/or 450 from the various signals may be combined to form a received vector 500. The decision application 402 may compare the received vector 500 with one or more known vectors that are stored within the database and/or data store 420 to detect one or more faces within an image. Accordingly, the vector 500 may be representative of a received image vector formed from the detected and/or sensed image at a particular instant or over a particular period. Alternatively, the vector 500 may be representative of a known or stored image vector within the database 420.

In another embodiment, the recognition application 404 may compare the received vector 500 with one or more known vectors that are stored within the database and/or data store 420 to identify a detected face within an image. Accordingly, the vector 500 may be representative of a detected face feature vector from the sensed image at a particular instant or over a particular period. Alternatively, the vector 500 may be representative of a known or stored face feature vector within the database 420.

In one embodiment, the vector 500 includes one or more known and/or stored vectors that operate as a rule set and/or rule sets to determine input and/or output characteristics of a personal computing device, and/or the operation of an application running on the device. In certain embodiments, the input/output control application 406 determines an input interface feature and/or characteristic based on a decision signal from the decision application 402 and/or decision application 404. In one embodiment, the input/output control application 406 determines an alert output characteristic based on a decision signal from the decision application 402. For example, where the personal computing device is a cellular telephone, upon an incoming call, the device may sense whether the user is viewing its display. If the user's presence is detected, the device may only provide a visual alert via the device's display. If the user's presence is not detected, the device may initiate an audible alert, e.g., ringtone, to alert the user about the incoming call. In this instance, the device may only apply face detection to determine whether any face is present and/or any person is viewing the device's display.

Alternatively, if an incoming email is received by the device, the device, e.g., device 100, may perform a face recognition to identify the user. If the face of the user is recognized and/or authenticated, then the user is alerted about the email and the email may be made available to the user for viewing. If the face of the user is not recognized and/or authenticated, the device 100 may not initiate an email alert, and may hide, suppress, and/or block the content of the email from the unauthorized user.

In one embodiment, any element of a known and/or stored vector 500 may include a range of values. Depending on the type of decision model employed by a model application, the model application could select a particular input and/or output characteristic based at least in part on whether a received/detected element was in the defined range of a known element of a known vector or rule set.

Figure 6:
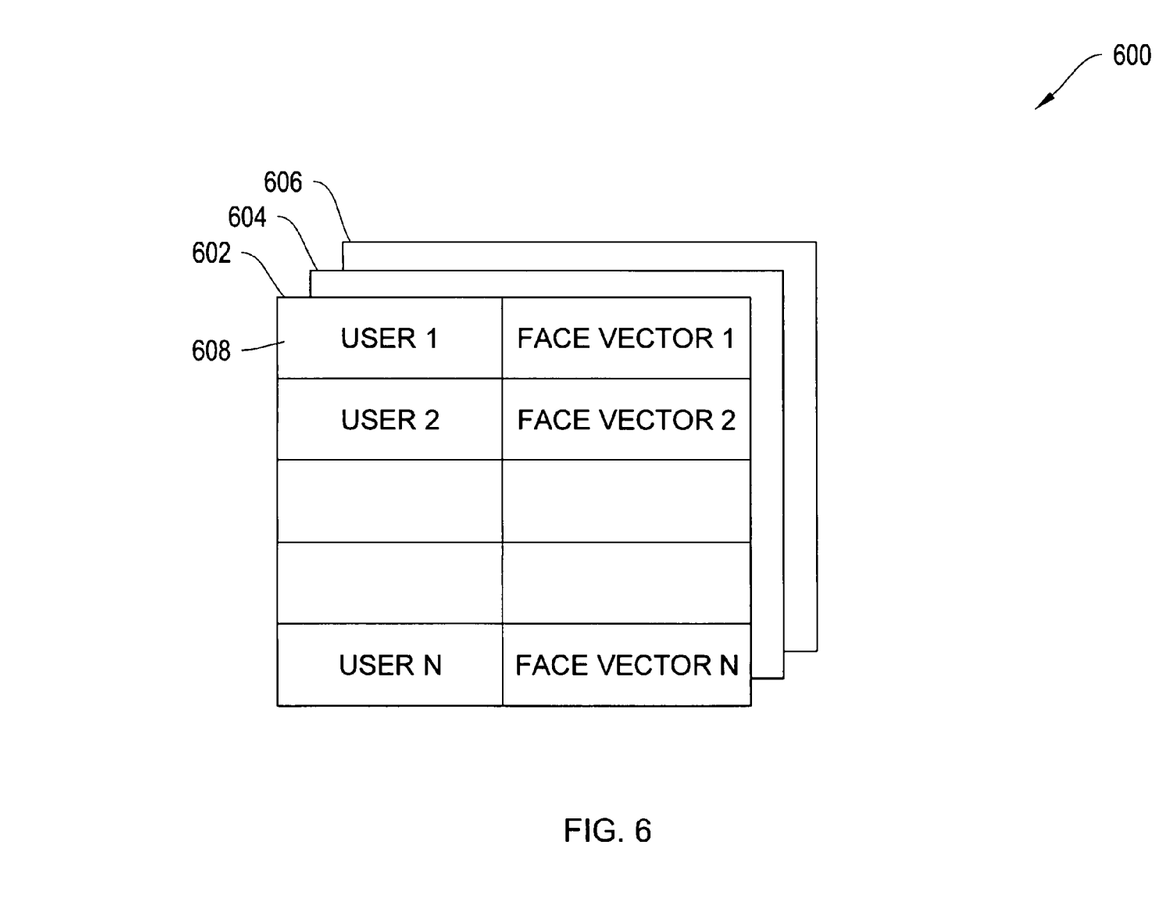
FIG. 6 is a diagram of a database or list associating face vectors or patterns with users according to an illustrative embodiment of the invention.

FIG. 6 is a diagram of a database 600 or list associating face vectors or patterns with users according to an illustrative embodiment of the invention. In certain embodiments, authorized users may be enrolled/configured for one or more applications 602, 604, and 606 within a personal computing device. In certain embodiments, control of an output interface configuration may include, without limitation, controlling a display setting, an audio setting, a GUI configuration, a video output setting, a vibration output setting, a communications output setting, an RF output setting, and/or any other output from a media device. Controlling an input configuration setting may include, without limitation, a display setting, a GUI configuration, an audio input setting, a video input setting, a communications input setting, an RF input setting, and/or any other form of input setting. A setting may include an intensity level setting, an on/off setting, a pattern arrangement, a sequence arrangement, type of protocol, and/or any other characteristic of an interface input or output signal or representation. For example, a screen saver application may include a timer that activates the screen saver after a period of user inactivity. However, a user may continue to passively interact with a personal computing device by, for example, viewing a text document. Thus, the input/output control application 406 may periodically or continuously receive user presence information from the detection application 402 to enable the control application to inhibit, delay, or reset the timer of the screen saver. Thus, a passive user is allowed to view the text document without the need to actively press any keys on a keypad or keyboard. In certain embodiments, the screen saver application, or any other application, may interact directly with the decision application 402 and/or 404 to determine whether a user is present and/or authorized to access certain application features.

In operation, in one embodiment, users 1 through N are associated with face vectors 1 through N respectively. Thus, when the application 602 is running, the application 602 may continuously compare received image sensor signals with the list of vectors associated with application 602 to determine when one or more of the input or output configurations is to be selected, adjusted, and/or configured depending on whether a face is detected and/or a particular user is recognized.

Figure 7:
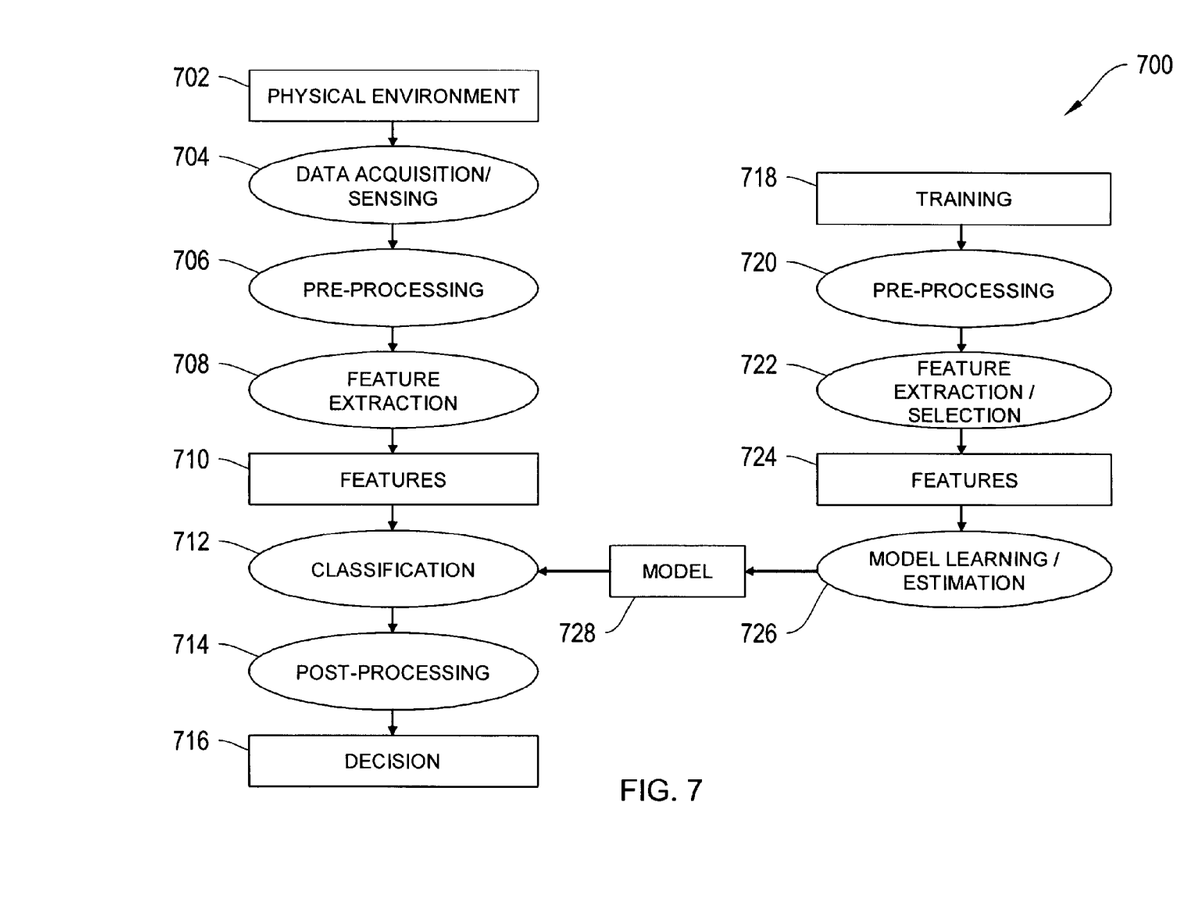
FIG. 7 is a flow diagram of a process for inputting and identifying face patterns based on one or more pattern recognition algorithms according to an illustrative embodiment of the invention.

FIG. 7 is a flow diagram of a process 700 for inputting, identifying, and/or recognizing face patterns based on one or more pattern recognition algorithms according to an illustrative embodiment of the invention. In certain embodiments, the face pattern recognition application 416 and face pattern training application 418 employ one or more pattern recognition algorithms and/or techniques to identify users based on their face patterns. First, the personal computing device 100 is subjected to a surrounding physical environment where the device experiences various changes in environmental conditions [Step 702]. The device 100 employs one or more image sensors 124 to capture an image of the environment adjacent to the device 100. In certain embodiments, the applications 416 and 418 account for bandwidth, resolution, sensitivity, distortion, signal-to-noise ratio, latency, and other issues with regard to data acquisition using the one or more image sensors 124 [Step 704].

The applications 416 and 418 may perform pre-processing of the image sensor signals to remove noise and/or to isolate patterns of interest from background information [Steps 706 and 720]. Then, the applications 416 and 418 may perform feature extraction by finding new representations in terms of identified features of sensor signals [Steps 708 and 722]. Particular features of image and/or detected face sensor signals may be identified as being more relevant for pattern identification [Steps 712 and 724]. Feature selection may include identifying discriminative features of image sensor signals such as similar values for similar patterns or different values for different patterns. Feature selection may include identifying invariant features such as with respect to translation, rotation, and/or scale of sensor signals. Feature selection may include identifying robust features with respect to occlusion, distortion, deformation, and variations in environment.

The training application 418 may capture training data in the form of an input from the user, e.g., user photographs [Step 718]. In one embodiment, an application may provide an option associated with an element that enables a user to input an image into the database 420 and/or 600 associated with the element. In another embodiment, the user is prompted to submit their facial image once, twice, thrice, or more times as part of a training process for the face pattern training application 418.

After pre-processing, feature extraction, and selection, the application 418 may then perform model learning and estimation whereby the application 418 learns to map between features and pattern groups and categories of sensor signals [Step 726]. The application 418 may select a pattern recognition model that is parametric or non-parametric. The application 418 may select a type of model that includes at least one of templates, decision-theoretic or statistical, syntactic or structural, neural, and hybrid forms of pattern recognition analysis [Step 728].

Once a particular model is selected, the face pattern recognition application 416 performs a classification and/or matching of the received sensor signal using features and learned models from the face pattern training application 418 to assign the received face pattern to a category of patterns. The application 416 may then compare the received sensor signal with the set of face patterns in the database 600 to find the closest match between the received sensor signal and the stored array of known face patterns [Step 712]. The application 416 may perform post-processing by evaluating its confidence in the decision [Step 714]. The application 416 may then decide which known pattern of the database 600 corresponds to the received sensor signal to identify the user.

In certain embodiments, the features of the known face patterns may be limited to minimize costs in processing power and storage. Accordingly, the selectivity of identifying a particular pattern may vary depending on the number of points or features stored or used for each known face pattern. In another embodiment, the known face pattern can be pre-generated and stored in the personal computing device by the manufacturer or another entity.

The face pattern recognition application 416 may perform pattern recognition based on at least one of Bayes Decision Theory, Generative methods, discriminative methods, non-metric methods, algorithm-independent machine learning, unsupervised learning and clustering, and like techniques. The Bayes Decision techniques may include, without limitation, at least one of Bayes Decision Rule, minimum error rate classification, normal density and discriminant functions, error integrals and bounds, Bayesian networks, and compound decision theory. The Generative methods may include, without limitation, at least one of maximum likelihood and Bayesian parameter estimation, sufficient statistics, various common statistical distributions, dimensionality and computational complexity, principal components analysis, fisher linear discriminant, expectation maximization, sequential data, hidden Markov models, and non-parametric techniques including density estimation. The discriminative methods may include, without limitation, distance-based methods, nearest neighbor classification, metrics and tangent distance, fuzzy classification, linear discriminant functions (hyperplane geometry, gradient descent and perceptrons, minimum squared error procedures, and support vector machines), and artificial neural networks. The non-metric methods may include, without limitation, recognition with strings and string matching. The algorithm-independent machine learning techniques may include, without limitation, no-free lunch theorem, bias and variance, re-sampling for estimation, bagging and boosting, estimation of misclassification, and classifier combinations.

While the above approaches have been described with respect to face recognition, it should be understand that these approaches may also be applied to certain face detection techniques also.

Figure 8:
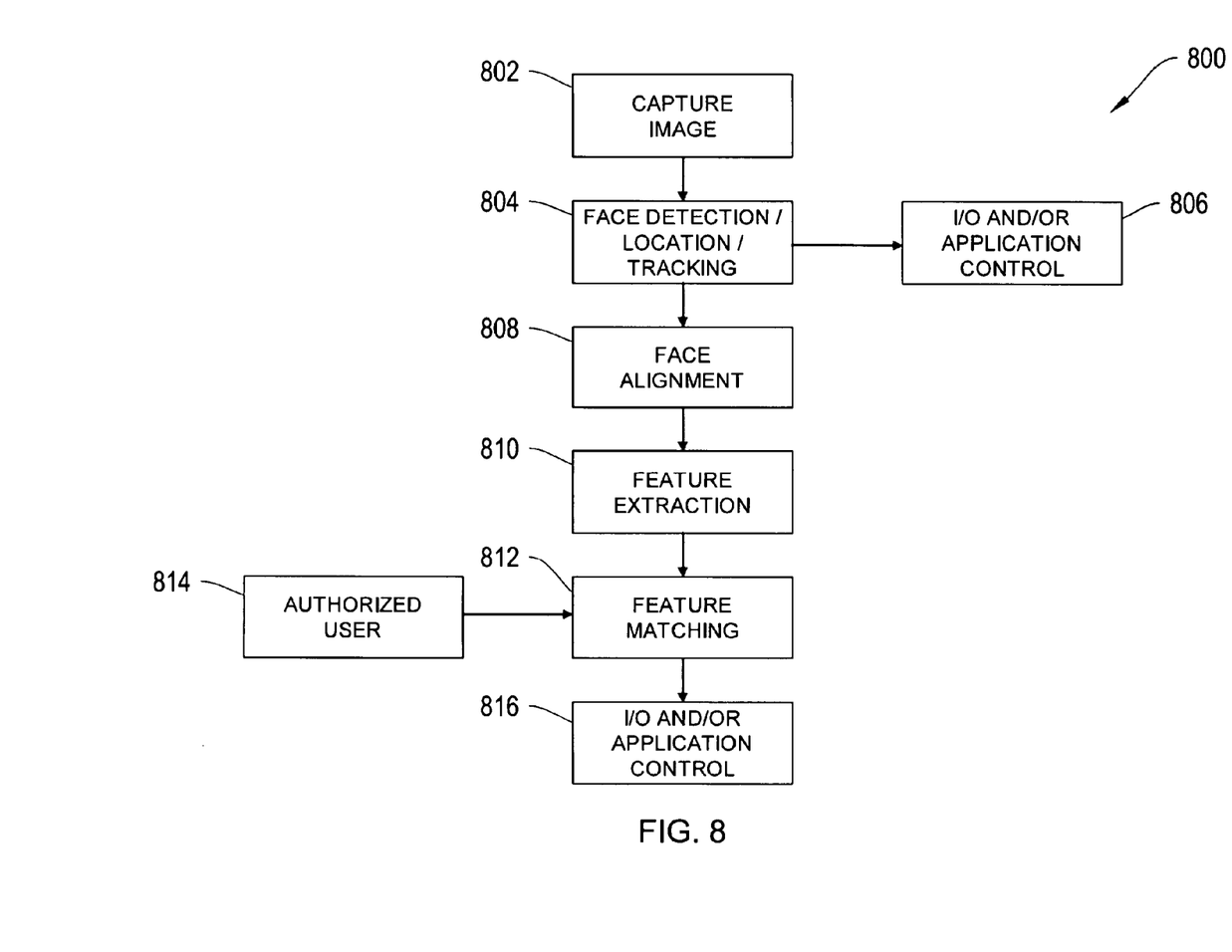
FIG. 8 is a flow diagram of an exemplary process whereby a personal computing device performs a face detection and/or face recognition to control the device's input/output interface and/or to control an application according to an illustrative embodiment of the invention.

FIG. 8 is a flow diagram of an exemplary process 800 whereby a personal computing device performs face detection and/or face recognition to control the device's input/output interface and/or to control an application according to an illustrative embodiment of the invention. A face detection and/or recognition system may have a wide range of applications, such as biometric authentication and surveillance, human-computer interaction, and multimedia management.

A face detection and recognition system may perform the process 800 by first capturing an image from an image sensor such as sensor 124 of FIG. 1 (Step 802). Then, the system performs face detection which provides information about the location and scale of each detected face in the captured image. In the case of video, the found faces may be tracked (Step 804). If only face detection is needed, the system then controls its user interface or an application based on whether a face is detected or not detected within the captured image or images (Step 806).

If face recognition is desired, the system then performs a face alignment to account for tilt or aspect variations of the detected face or faces. Facial components, such as eyes, nose, and mouth, and facial outline are located, and thereby the input face image is normalized in geometry and photometry (Step 808). Next, the system performs feature extraction where features useful for distinguishing between different persons are extracted from the normalized face (Step 810). The system may include a database wherein user faces have been enrolled to enable user authorization and/or authentication (Step 814). Then, the system performs a face classification where the extracted feature vector of the input face is matched against those of enrolled faces in the database such as database 600. The system outputs the identity of the face when a match is found with a sufficient confidence or as an unknown face otherwise (Step 812). Then, the system controls the user interface and/or an application based on whether a user's face is recognized or not recognized (Step 816).

The personal computing device may support user presence sensing control for numerous applications including, without limitation, e-mail, texting, word processing, interface navigation, data searching, web surfing, database management, remote control systems, multimedia applications, or any application operating with a personal computing device.

It will be apparent to those of ordinary skill in the art that methods involved in the present invention may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

It is understood that the various features, elements, or processes of the foregoing figures and description are interchangeable or combinable to realize or practice the invention describe herein. Those skilled in the art will appreciate that the invention can be practiced by other than the described embodiments, which are presented for purposes of illustration rather than of limitation, and the invention is limited only by the claims which follow.

What is claimed is:

1. An electronic device comprising:
    an image sensor for capturing at least one image;
    a media playback component; and
    a processor that, without receiving active user input information from a user of the electronic device, is operative to:
        analyze the captured at least one image to detect a face;
        in response to the analysis, determine whether the face is detected; and
        in response to a determination that the face is detected, automatically control the playback of media by the media playback component, wherein the automatic control comprises at least one of the following:
        inhibiting the playback of a screen saver;
        scrolling through a listing of elements; and
        re-starting the playback of a file.

2. The electronic device of claim 1, wherein the automatic control comprises scrolling through a listing of elements.

3. The electronic device of claim 1, wherein the automatic control comprises inhibiting the playback of a screen saver.

4. The electronic device of claim 1, wherein the automatic control comprises re-starting the playback of a file.

5. The electronic device of claim 1, wherein the processor is operative to analyze the captured at least one image to detect a face of an authorized user of the device.

6. An electronic device comprising:
    an imaging unit configured to acquire an image;
    a receiver configured to receive an incoming communication from a remote source; and
    a processor configured to:
        determine a type of the received incoming communication;
        in response to a determination that the received incoming communication is a first type of communication, analyze the acquired image to detect any face; and
        in response to a determination that the received incoming communication is a second type of communication, analyze the acquired image to detect a particular face belonging to an authorized user, wherein the first type is different than the second type.

7. The electronic device of claim 6, wherein:
    the processor is configured to analyze the acquired image to detect any face in response to the determination that the received incoming communication is the first type of communication and not in response to the electronic device receiving an active user interaction from any user of the electronic device; and
    the processor is configured to analyze the acquired image to detect the particular face in response to the determination that the received incoming communication is the second type of communication and not in response to the electronic device receiving an active user interaction from any user of the electronic device.

8. The electronic device of claim 6, wherein:
    the first type of communication is a telephone call; and
    the second type of communication is an e-mail.

9. The electronic device of claim 6, wherein the processor is further configured to:
    in response to a determination that any face is detected in response to a determination that the received incoming communication is the first type of communication, perform a first action corresponding to the received incoming communication; and
    in response to a determination that no face is detected in response to a determination that the received incoming communication is the first type of communication, perform a second action corresponding to the received incoming communication, wherein the first action is different than the second action.

10. The device of claim 9, wherein:
    the first action comprises at least one of displaying a visual notification, not outputting an audible notification, and not vibrating the device; and
    the second action comprises at least one of outputting an audible notification and vibrating the device.

11. The electronic device of claim 6, wherein the processor is further configured to:
    in response to a determination that the particular face is detected in response to a determination that the received incoming communication is the second type of communication, perform a first action corresponding to the received incoming communication; and
    in response to a determination that the particular face is not detected in response to a determination that the received incoming communication is the second type of communication, perform a second action corresponding to the received incoming communication, wherein the first action is different than the second action.

12. The electronic device of claim 11, wherein:
    the first action comprises at least one of outputting an alert regarding the received incoming communication and allowing access to content of the received incoming communication; and
    the second action comprises restricting access to content of the received incoming communication.

13. The electronic device of claim 6, wherein:
    the processor is further configured to:
        in response to a determination that any face is detected in response to a determination that the received incoming communication is the first type of communication, perform a first action corresponding to the received incoming communication;
        in response to a determination that no face is detected in response to a determination that the received incoming communication is the first type of communication, perform a second action corresponding to the received incoming communication;
        in response to a determination that the particular face is detected in response to a determination that the received incoming communication is the second type of communication, perform a third action corresponding to the received incoming communication; and
        in response to a determination that the particular face is not detected in response to a determination that the received incoming communication is the second type of communication, perform a fourth action corresponding to the received incoming communication;
the first type of communication is a telephone call;
the second type of communication is an e-mail;
the first action comprises at least one of displaying a visual notification, not outputting an audible notification, and not vibrating the device;
the second action comprises at least one of outputting an audible notification and vibrating the device;
the third action comprises at least one of outputting an alert regarding the received incoming communication and allowing access to content of the received incoming communication; and
the fourth action comprises restricting access to content of the received incoming communication.

14. A method comprising:
acquiring an image with an electronic device;
receiving with the electronic device an incoming communication from a remote source;
determining a type of the received incoming communication;
in response to a determination that the received incoming communication is a first type of communication, analyzing the acquired image to detect any face; and
in response to a determination that the received incoming communication is a second type of communication, analyzing the acquired image to detect a particular face belonging to an authorized user, wherein the first type is different than the second type.

15. The method of claim 14, wherein:
the method comprises analyzing the acquired image to detect any face in response to the determination that the received incoming communication is the first type of communication and not in response to receiving with the electronic device an active user interaction; and
the method comprises analyzing the acquired image to detect the particular face in response to the determination that the received incoming communication is the second type of communication and not in response to receiving with the electronic device an active user interaction.

16. The method of claim 14, wherein:
the first type of communication is a telephone call; and
the second type of communication is an e-mail.

17. The method of claim 14, wherein:
in response to a determination that any face is detected in response to a determination that the received incoming communication is the first type of communication, the method further comprises performing a first action corresponding to the received incoming communication; and
in response to a determination that no face is detected in response to a determination that the received incoming communication is the first type of communication, the method further comprises performing a second action corresponding to the received incoming communication, wherein the first action is different than the second action.

18. The method of claim 17, wherein:
the first action comprises at least one of displaying a visual notification, not outputting an audible notification, and not vibrating the device; and
the second action comprises at least one of outputting an audible notification and vibrating the device.

19. The method of claim 14, wherein:
in response to a determination that the particular face is detected in response to a determination that the received incoming communication is the second type of communication, the method further comprises performing a first action corresponding to the received incoming communication; and
in response to a determination that the particular face is not detected in response to a determination that the received incoming communication is the second type of communication, the method further comprises performing a second action corresponding to the received incoming communication, wherein the first action is different than the second action.

20. The method of claim 19, wherein:
the first action comprises at least one of outputting an alert regarding the received incoming communication and allowing access to content of the received incoming communication; and
the second action comprises restricting access to content of the received incoming communication.

21. The method of claim 14, wherein:
the first type of communication is a telephone call;
the second type of communication is an e-mail;
in response to a determination that any face is detected in response to a determination that the received incoming communication is the first type of communication, the method further comprises performing a first action corresponding to the received incoming communication;
in response to a determination that no face is detected in response to a determination that the received incoming communication is the first type of communication, the method further comprises performing a second action corresponding to the received incoming communication
in response to a determination that the particular face is detected in response to a determination that the received incoming communication is the second type of communication, the method further comprises performing a third action corresponding to the received incoming communication;
in response to a determination that the particular face is not detected in response to a determination that the received incoming communication is the second type of communication, the method further comprises performing a fourth action corresponding to the received incoming communication;
the first action comprises at least one of displaying a visual notification, not outputting an audible notification, and not vibrating the device;
the second action comprises at least one of outputting an audible notification and vibrating the device;
the third action comprises at least one of outputting an alert regarding the received incoming communication and allowing access to content of the received incoming communication; and
the fourth action comprises restricting access to content of the received incoming communication.

* * * * *